United States Patent [19]
Lenz

[11] Patent Number: 5,884,427
[45] Date of Patent: Mar. 23, 1999

[54] MOVEMENT ASSEMBLY FOR USE WITH ANIMAL DECOY

[76] Inventor: Eric D. Lenz, 4916 Seton Pl., Greendale, Wis. 53129

[21] Appl. No.: 898,228

[22] Filed: Jul. 22, 1997

Related U.S. Application Data

[60] Provisional application No. 60/023,141 Jul. 30, 1996.
[51] Int. Cl.$^6$ .................................................. A01M 31/06
[52] U.S. Cl. ........................................................... 43/2
[58] Field of Search ..................... 43/1, 2; 40/414, 40/417, 423, 614; 446/356, 330, 298; 74/54, 89.22

[56] References Cited

U.S. PATENT DOCUMENTS

| | | | |
|---|---|---|---|
| 118,982 | 9/1871 | Swann | 74/54 |
| 127,196 | 5/1872 | Shively | 74/54 |
| 1,312,328 | 8/1919 | Johansson | 74/54 |
| 2,038,460 | 4/1936 | Weiss | 446/330 |
| 2,121,175 | 6/1938 | Savage | 446/298 |
| 2,329,564 | 9/1943 | Thomas | 446/356 |
| 2,620,594 | 12/1952 | Parisi | 446/298 |
| 2,744,201 | 5/1956 | Glaser | 40/614 |
| 2,763,959 | 9/1956 | Glass et al. | 446/298 |
| 2,953,869 | 9/1960 | Collischan | 40/417 |
| 3,153,871 | 10/1964 | Semba | 40/417 |
| 4,378,706 | 4/1983 | Miyamoto | 74/89.22 |
| 4,680,022 | 7/1987 | Hoshino et al. | 446/356 |
| 4,804,285 | 2/1989 | Bradford | 74/89.22 |
| 4,810,226 | 3/1989 | Takahashi et al. | 446/356 |
| 4,852,288 | 8/1989 | Payne et al. | 43/2 |
| 4,867,730 | 9/1989 | Lee | 446/330 |
| 5,029,408 | 7/1991 | Smith et al. | 43/1 |
| 5,459,958 | 10/1995 | Relake | 43/2 |
| 5,546,692 | 8/1996 | Byers | 43/2 |
| 5,692,328 | 12/1997 | Pettit | 40/414 |
| 5,791,081 | 8/1998 | Turner et al. | 43/2 |
| 5,831,764 | 11/1998 | Brinkman et al. | 74/89.22 |

Primary Examiner—Michael J. Carone
Assistant Examiner—Darren Ark
Attorney, Agent, or Firm—Joseph S. Heino

[57] ABSTRACT

An animal decoy mechanism includes a direct current motor which is powered by a direct current battery pack. The motor, in turn, is used to rotate a cam pulley which has at least one projecting member extending to one side of the cam pulley. The projection activates a tail flicking member to simulate the tail flicking action of a live animal.

3 Claims, 1 Drawing Sheet

MOVEMENT ASSEMBLY FOR USE WITH ANIMAL DECOY

This application claims the benefit of U.S. Provisional application Ser. No. 60/023,141, filed Jul. 30, 1996.

1. Field of the Invention

This invention relates generally to animal decoys of the type which are commonly used for hunting large game, such as deer, turkey and the like. More particularly, it relates to a decoy mechanism which functionally adapts the animal decoy to one which simulates life-like animal movements and which aids in the attraction of live animals to the decoys.

2. Background of the Invention

It has long been recognized that the use of decoys can aid the hunter in the attraction of like animals to areas such that the hunter is placed in close proximity to his or her prey. Indeed, the ancients used duck and goose decoys to entice migratory flocks from the skies to areas of safe haven only to fall prey to a hunter's swift arrow. Modern day hunters continue the practice of utilizing decoys in an attempt to outsmart their prey. They have, however, elevated the sophistication of such decoys to the point that such decoys can incorporate movement mechanisms to simulate movement of like prey to entice the prey's visual senses. They can even incorporate noise generators and scent generators to access the prey's other senses in the attempt to entice. See, for example, U.S. Pat. No. 5,029,408 issued to Smith and U.S. Pat. No. 5,459,958 issued to Reinke.

In this inventor's experience, however, the motion and movement generators of such mechanisms have a tendency to be rather complex in the number of parts which are used in the mechanisms. They also have a tendency to be rather noisy. That is, the use of a solenoid, or electrically activated switch, is quite common in such mechanisms. In other applications, the solenoid may be the perfect element to use when movement is desired or required. In the application of simulating animal movements, however, the use of a solenoid can be undesirable. The solenoid, by its very nature, has a certain amount of noise inherent in its operation. That noise, in the case of animal decoys, may actually work to keep curious animals away rather than to attract them. Such mechanisms, in the experience of this inventor, also have a tendency to wear down the power source for such movement relatively quickly.

SUMMARY OF THE INVENTION

It is, therefore, a principal object of this invention to provide a new, useful and uncomplicated decoy assembly which consists of a assembly mechanism housing which can be mounted into any number of commercially available animal decoys to simulate animal movement. In the preferred embodiment, the assembly mechanism of the present invention is used to activate a tail-flicking action in a deer decoy which simulates the tail flicking action of a live animal. It is a further object of this invention to provide such a mechanism which requires only a minimal number of elements and which requires only a minimal number of steps to utilize. It is yet another object of this invention to provide such a mechanism which is quiet, which allows for minimal power draw and maximum battery life, which can be used in a wide range of temperatures and in all weather conditions without failure and which can provide for variable timing of the tail flicking action.

The present invention has obtained these objects. It provides, in the preferred embodiment, for an assembly mechanism of which is used to activate a tail-flicking action in a deer decoy. The mechanism includes a direct current motor which is powered by a direct current battery pack. The motor, in turn, is used to rotate a cam pulley which has a number of projecting members extending to one side of the cam pulley. These projections activate a tail flicking member to simulate the tail flicking action of a live animal. The foregoing and other features of the device of the present invention will be further apparent from the description which follows.

DETAILED DESCRIPTION

Figure 1:
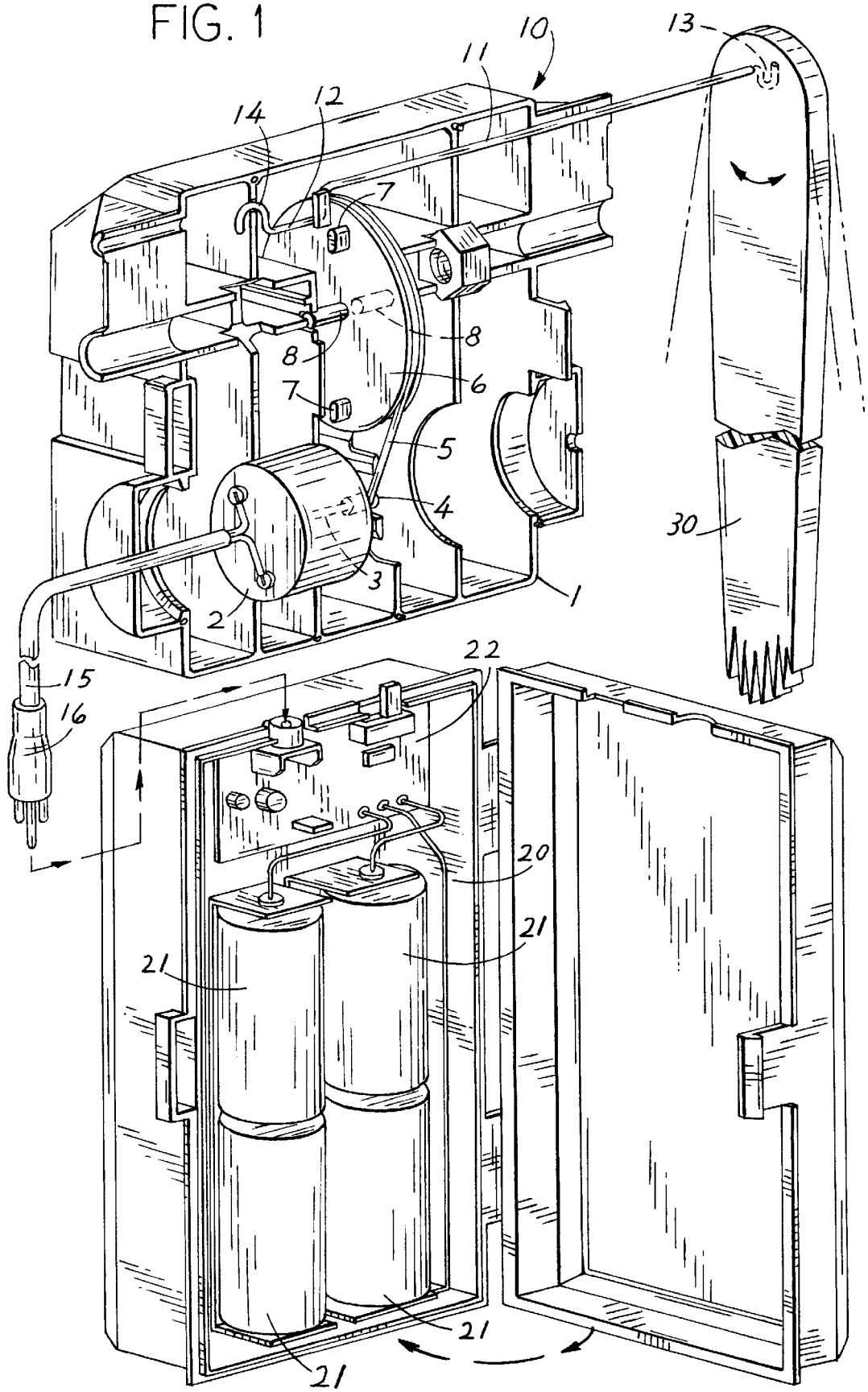
FIG. 1 is a front perspective and partially cut-away view of an assembly utilizing the device of the present invention.

Referring now to the drawings in detail, FIG. 1 shows an assembly, generally identified 10, constructed in accordance with the present invention. The assembly 10 includes a housing 1 which is functionally adapted to be mounted into the body cavity of a hollow bodied animal decoy. In the preferred embodiment, the housing 1 is mounted immediately to the inside of the cavity adjacent the tail area of the animal decoy. The housing 1 has mounted within it a direct current drive motor 2. At the end of the rotor 3 of the drive motor 2 is attached a drive pulley 4. Also situated within the housing 1 is a cam pulley 6. The cam pulley 6 is allowed to rotate within the housing 1 about a cam pulley rod 8. To one side of the cam pulley 6 are located a plurality of cam pulley extension members 7, the significance of which will be more apparent further on in this detailed description. The cam pulley 6 and the drive pulley 4 are generally coplanar and connected by use of a drive belt 5.

The drive motor 2 is powered by a power pack 20. The power pack 20 contains a plurality of batteries 21. Also situated within the power pack 20 is a timing circuit 22 which allows the current flowing from the power pack 20 to the drive motor 2 to be varied. The power pack 20 is connected to the drive motor 2 by a power cord and jack 15, 16. The power cord and jack 15, 16 of the present invention are intended, and functionally adapted, to be easily removable from the decoy so as to allow battery replacement when such is desired or required.

Also situated within the housing 1 is a tail holding rod 11 which is allowed to freely rotate about its linear axis. The tail holding rod 11 is supported at one end 14 within the housing 1. The opposite end 13 of the tail holding rod 11 extends out of the housing 1 and has a hook formed in it. The hook end 13 of the tail holding rod 11 is functionally adapted to hold a simulated tail 30 in it. The tail holding rod 11 is held in place simply by the weight of the tail 30 which is held within the hook end 13 of the rod 11. Situated within the tail holding rod 11 is a rod extension portion 12 which, in the preferred embodiment, is simply a double bend in the rod 11 which creates an extension member 12 within the rod 11 itself. The rod extension member 12 is functionally adapted to engage the extension members 7 of the cam pulley 6.

In application, the batteries 21 are placed within the battery pack 20. The timing circuit 24 is programmed to the timing cycle desired or required by the user. In this inventor's experience, a cycle which achieves tail flicking about every 7 seconds is optimum for hunting deer, for example. The power cord and jack 15, 16 are plugged into the battery pack 20 and the battery pack 20 is inserted into the decoy's body cavity. With the drive motor 2 activated, the motor rotor 3 and the drive pulley 4 begin to rotate. Rotation of the drive pulley 4 moves the drive belt 5 and, in turn, moves the cam pulley 6 to turn about the cam pulley rod 8. With the cam pulley 6 in rotational motion, the extension portion 12 of the tail holding rod 11 is placed into cyclic contact with the extension members 7 of the cam pulley 6. This creates a slight displacement of the extension portion 12 of the tail holding rod 11 and rotation of the tail holding rod 11 and, in turn, a slight movement of the rod hook 13 and of the tail 30 being suspended by the rod hook 13.

From the foregoing detailed description of the illustrative embodiment of the invention set forth herein, it will be apparent that there has been provided a new, useful and uncomplicated decoy assembly which consists of a assembly mechanism housing which can be mounted into any number of commercially available animal decoys to simulate animal movement such as tail flicking action, which requires only a minimal number of elements and which requires only a minimal number of steps to utilize, and which is quiet, which allows for minimal power draw and maximum battery life, which can be used in a wide range of temperatures and in all weather conditions without failure and which can provide for variable timing of the tail flicking action.

The principles of this invention having been fully explained in connection with the foregoing, I hereby claim as my invention:

1. A movement assembly which is mountable within the cavity of an animal decoy for simulating movement of a decoy member which comprises a first assembly enclosure portion, a second assembly enclosure portion, the second assembly enclosure portion being identical to the first assembly enclosure portion, said first and second assembly enclosure portions being interlockingly engagable to form an assembly enclosure, a drive mechanism, said drive mechanism including a direct current electric motor having a drive pulley and further including a direct current power supply electrically connected to said electric motor, means for supporting the drive mechanism within the assembly enclosure, a movement cam, said movement cam comprising a generally planar disk having a circumferential surface, means for supporting the movement cam within the assembly enclosure, means for driving the movement cam, said cam driving means including a recess defined about the circumferential surface of said movement cam and further including a cam drive belt, said cam recess being functionally adapted to receive said drive belt, said drive belt being engagable by and drivable by the pulley of the direct current electric motor, a movement rod, said movement rod including a distal end which extends outwardly from the assembly enclosure, means for supporting the movement rod within the assembly enclosure, said rod support means, said cam support means and said drive mechanism support means including a plurality of complimentary support members defined within each of said first and second assembly portions, means for actuating the movement rod, means for variably timing the actuation of the movement rod, and a tail simulating member said tail simulating member being functionally adapted to be suspended from and by the distal end of the movement rod.

2. The movement assembly of claim 1 wherein said rod actuating means includes a rod movement member extending from a planar surface of the movement cam and a rod bend formed within the movement rod, said bend being engagable with the rod movement member whereby movement of the rod is affected when the rod movement member engages the rod bend.

3. The movement assembly of claim 2 wherein said variable timing means includes a programmable timing circuit which controls the revolutions per minute of said motor.

* * * * *